3,686,091
ELECTROCHEMICAL CELL
Kenneth B. Sawa, Buena Park, and Radhakrishna Murty Neti, Brea, Calif., assignors to Beckman Instruments, Inc.
No Drawing. Filed Oct. 2, 1970, Ser. No. 77,740
Int. Cl. G01n 27/30, 27/40
U.S. Cl. 204—195 F  44 Claims

ABSTRACT OF THE DISCLOSURE

The disclosure relates to an improvement in an electrochemical cell for use in ion potential measurements of solutions. The cell contains a sensing electrode, a reference electrode, and an external electrolyte comprising the solution to be tested. At least one electrode comprises an internal half cell supported in a container of nonconductive material containing a salt solution, an internal electrolyte and a liquid junction structure of an ion permeable material. The improvement comprises a surfactant added to the cell so that the contact angle between the solution and the liquid junction structure is less than about 90°. As a result the liquid junction structure is made more permeable to water molecules.

An improved electrochemical electrode for use in ion potential measurements of solutions is also disclosed.

BACKGROUND OF THE INVENTION

This invention relates to electrochemical cells. It is particularly applicable to such cells used in ion potential measurements of solutions. Although the improvement of the instant invention may be beneficially applied to all electrochemical cells so used, it is particularly advantageous when used in conjunction with the improved electrochemical electrodes disclosed in copending applications S.N. 65,898 and 68,587.

In making measurements of the ion concentration of solutions, the electrochemical cells typically contain a sensing electrode, a reference electrode, and an external electrolyte which comprises the solution to be tested. At least one of the electrodes, either the sensing electrode or the reference electrode, or both, comprises an internal half cell supported in a container of nonconductive material, e.g. glass, containing a salt solution as an internal electrolyte and a liquid junction structure or membrane of an ion permeable material. If the electrode so constructed is the specific or select ion electrode then the internal electrolyte will usually be a solution of the ion to be measured and the internal half cell will be a calomel or silver-silver chloride internal reference electrode. If the electrode so constructed is the reference electrode then the internal electrolyte or salt bridge solution is a strong equitransferent salt solution such as saturated potassium chloride or potassium nitrate. Electrical connection between the salt solution and the sample or test solution is made through the liquid junction structure. A high impedance voltmeter is used to measure the potential developed between the specific ion electrode and the reference electrode when the pair is immersed in the electrolyte solution.

A substantial improvement in the electrode structures is involved in the inventions disclosed in copending applications S.N. 68,587 and 65,898. As disclosed therein, the liquid junction structures or diffusion membranes are made from a polymeric material. This material will usually be a hydrophobic polymer. This material is quite effective and permits the transport of hydroxyl ions and/or water molecules across the liquid junction structure without a so-called leaking or flowing electrolyte junction. The operation of this material is not quite satisfactory as desired in certain organic systems however. One such system is benzene in water. The nonpolar nature of the major component of the liquid junction material preferentially attracts the organic materials. These organic materials form an insulating layer around the liquid junction structure and prevent the transfer of hydroxyl groups or water molecules essential for the operation of the electrodes. A similar effect can also occur with conventional electrode materials.

SUMMARY OF THE INVENTION

It is an object of the instant invention to provide an improved electrochemical cell wherein the liquid junction structure is made more permeable to water molecules. It is a further object of the instant invention to provide an electrode for use in an electrochemical cell wherein the liquid junction structure of the electrode is made more permeable to hydroxyl groups.

It is an advantage of the instant invention that, although particularly concerned with the liquid organic solution problem mentioned above, it enhances the reliability and effectiveness of all electrodes in electrochemical cells depending upon the transfer of water molecules or hydroxyl groups through a liquid junction structure.

Accordingly, the instant invention relates to an eletrochemical cell for use in ion potential measurements of solutions. The cell contains a sensing electrode, a reference electrode, and an external electrolyte comprising the solution to be tested. At least one of the electrodes comprises an internal half cell supported in a container of nonconductive material containing a salt solution as an internal electrolyte, and a liquid junction structure of an ion permeable material. A surfactant is added to the cell so that the contact angle between the solution and the liquid junction structure is less than about 90°. This means the water wettability of the surface will be enhanced and the liquid junction structure will be made more permeable to water molecules or hydroxyl groups.

The instant invention also relates to an electrode for use in ion potential measurements of solutions wherein the surfactant is added to the electrode.

Other objects and advantages of this invention will be apparent from the detailed description following.

DETAILED DESCRIPTION

Although not so limited, the instant invention will be described with particular reference to electrochemical cells wherein the liquid junction structure of either the specific or select ion electrode or the reference electrode is in accordance with the inventions described in copending applications Ser. No. 65,898 and 68,587. Thus, the ion permeable material will desirably comprise a hydrophobic polymer which may be in admixture with one or more additional materials whose characteristics will depend upon whether the electrode is to be used as a reference electrode or as a specific ion electrode. The hydrophobic polymer desirably is selected from the group consisting of polyfluoroalkanes, polyethylenes, and polyvinyl chlorides. Polytetrafluoroalkanes are particularly effective, the most well known of these perhaps being polytetrafluoroethylene.

Depending upon the solution being tested and the type of electrode material being used, the quantity of surfactant present may vary from about 10 parts per million up to the saturation level of the surfactant in the solution. Desirably, it need not exceed 10,000 parts per million, however. The surfactant may be present in the test solution, in the internal electrolyte or mixed into the material of the liquid junction structure of the electrode itself. The nonionic surfactants have been found particularly effective although some anionic surfactants have also been found satisfactory. Cationic surfactants have been found to influence the measured pH of the solution and accordingly are not satisfactory. As mentioned above the instant invention is particularly effective when the test solution is an aqueous solution of an organic material, particularly an organic material that does not itself contain a hydroxyl group, such as benzene.

The addition of the surfactant to the solution lowers the surface tension of the solution. As a result the contact angle between the solution and the surface of the liquid junction structure is also reduced. As is known to those skilled in the art, if this contact angle, which is proportional to the surface tension, is less than 90°, the surface will be preferentially water wet. If the contact angle is greater than 90° the surface will be preferentially wet by the organic liquid. This will impede the movement of water molecules and hydroxyl groups across the liquid junction structure. The surface tensions of various organic liquids and also of water are listed in Table I.

TABLE I

| Compound: | Surface tension (dynes per square centimeter) |
| --- | --- |
| Benzene | 28–30 |
| Acetone | 26–24 |
| Acid aldehyde | 21 |
| Acetic acid | 29 |
| Ethyl amine | 20 |
| n-Hexane | 18 |
| Methyl alcohol | 25 |
| Xylene | 28–30 |
| Water | 73 |

The organic materials will tend to form an insulating layer around the liquid junction structure or membrane and prevent the transport of water molecules or hydroxyl groups essential for the operation of the electrode. If the organic liquid itself contains a hydroxyl group the water molecules or hydroxyl groups can move across the liquid junction structure and the use of a surfactant is not absolutely necessary although it will improve the mobility of the water molecules and hydroxyl groups.

If nonionic surfactants are used, the ethoxylates of isomeric linear alcohols and alkylphenyl ethers of polyethylene glycol have been found particularly effective. One particularly effective alkylphenyl ether of polyethylene glycol is that known as Triton X–100. Triton X–100 is prepared by the reaction of t-octylphenol with ethylene oxide. Thus the alkylphenyl group is from octylphenol and the molecule contains 9 to 10 ethylene oxide groups.

A particularly suitable ethoxylate of an isomeric linear alcohol is that known as Tergitol 15–S–9. The linear alkyl portion of the molecule is a mixture of $C_{11}$ to $C_{15}$, i.e. 11 to 15 carbon molecule linear chain. The hydrophilic portion is a polyoxyethylene chain randomly attached to the linear aliphatic chain through an ether linkage. The ethoxy portion contains 9 ethylene oxide groups.

A particularly effective anionic surfactant is that known in the trade as Triton X–301. This surfactant is a sodium alkylaryl polyether sulfate containing from 9 to 10 ethylene oxide groups.

The surfactant may be added either to the internal electrolyte of the electrode, the liquid junction structure itself, or the external electrolyte, i.e. the test solution. The reason for this is the surfactant itself will transport across the liquid junction structure and wet the external surface thereof, lowering the surface tension of the adjacent test solution and hence reducing the contact angle below 90°.

In a series of tests a reference electrode of the type described in copending application Ser. No. 65,898 was used. The liquid junction structure was a composite of polytetrafluoroethylene and inert salt (potassium chloride). In all cases the internal filling solution of the electrode was 4 molar potassium chloride saturated with silver chloride and 1½ grams of solid potassium chloride. The solid potassium chloride was added to ensure the solution would remain saturated at elevated temperatures.

The resistance of the electrode was 13 kilohms in a pH 7 buffer solution. The potential measured against a standard saturated calomel electrode was − 45 millivolts as measured in a pH 7 buffer solution.

In the first series of tests the pH of 170 milliliters or cubic centimeters of tap water was measured as 8.33 with the signal being stable. The pH was measured by means of a Beckman Expandomatic pH Meter Model No. 76004 connected across the two electrodes in the known manner. Measurement was taken again when one drop of benzene was added to the solution and a stable reading of 8.33 was again obtained. When 0.5 cc. of benzene had been added the pH still measured 8.33 and the signal was stable. When 2.5 cc. of benzene had been added the signal became noisy and the pH reading was swinging from 7.3 to 8.3. When 7.5 cc. of benzene were added the pH reading was very erratic and unstable and seemed to be mostly around 3. When one additional drop of benzene, i.e. approximately 0.03 to 0.05 cc. was added the resistance increased to such an extent the pH reading was off scale. In other words sufficient organic material was measured to form an insulating layer around the liquid junction structure of the electrode. One drop of Tergitol 15–S–9 was then added to the electrolyte and a white emulsion formed. Within five minutes the pH meter reading began coming back on scale. Within approximately an hour the meter reading was fluctuating between 7.4 and 8.6. Additional Tergitol 15–S–9 was added to bring the quantity added up to two drops of 0.1 cc. The pH reading continued to fluctuate between 7.4 and 8.6. A total of four drops was then added with the reading shifting to 7.8 to 8.6. When ten drops were added the readings stabilized between 8.3 and 8.4 and were noticeably less noisy than before. As mentioned previously the pH of the solution was 8.35. A total of fifteen drops of Tergitol 15–S–9 was then added with no additional effect.

In the next tests the pH of 175 milliliters of tap water was measured as 8.05. One drop of benzene was added and the reading started fluctuating between 7.9 and 8.1 and was quite noisy. When a total of two drops were added the reading continued noisy and was fluctuating between 7.9 and 8.2. When a total of 0.5 cc. of benzene were added the reading was very noisy and seemed to be still fluctuating between 7.9 and 8.2. When a total of 2.5 cc. of benzene were added the reading seemed to be fluctuating mostly between 6 and 7 and was also going off scale. When 4.5 cc. of benzene had been added the reading was off scale entirely.

One drop of the surfactant known as Priminox T–1M was then added. Priminox T–1M is a cationic surfactant and has been described as a tertiary amine of ethylene glycol containing 18 to 22 carbon groups. The pH reading came back on scale fluctuating from 2 to 9 with the pH seeming to be approximately 7.5 to 8.5. When two drops were added the fluctuations were not as wild and the reading seemed to be between 7 and 8.4. When six drops were added the reading fluctuated between 8 and 8.5. When a total of ten drops had been added the reading seemed to be 8.5 and was stable. When 20 drops were added the reading seemed to be 9.6 with flucations occurring from 8.25 to 9.6. As stated the pH of the solution was 8.05. Thus the surfactant was showing an effect on the pH and making the solution show an alkaline reading These final pH readings were not noisy but the reading was around 9.2 which was too high and showing the solution to be more alkaline than it actually was. Thus Priminox T–1M, a cationic surfactant, is not suitable because it has an undesirable effect of changing the pH of the test solution.

In the next series of tests the pH of 175 ml. of tap water was measured as 8.15. When one drop of benzene was added the pH stayed at 8.15. When a total of 0.2 cc. of benzene had been added the pH reading started swinging between 8 and 8.5 and was electrically noisy. When 2.5 cc. of benzene had been added full scale flucuations of the pH instrument occurred. When one drop of Triton X-100 was added to the solution, a white milky emulsion was formed and the noise of the pH reading decreased and the reading seemed to stabilize around 8.1. When three drops of Triton X-100 were added the pH reading stayed at 8.1. The amount present was then increased to 5 cc. The pH readings showed some slight fluctuation, fluctuating between 8.0 and 8.1. This is almost an insignificant fluctuation. When a total of 20 cc. of benzene had been added the reading finally was fluctuating between 7.5 and 8.5 with the reading seeming to center around 8.1. This indicates Triton X-100 is an extremely effective surfactant for the instant purposes.

In the next series of tests the pH of 175 milliliters of tap mater was measured as 8.1 and stable. When one drop of benzene was added to the solution the reading remained stable at 8.1. After the addition of a total of 2.5 cc. of benzene the reading was fluctuating between 6 and 10 and was noisy. At this point a drop of the surfactant known as Triton QS-10, an anionic surfactant, was added. The pH reading then stabilized at around 5.15. When two drops of QS-10 were added the reading decreased to 3.3 and with the addition of three drops decreased further to 2.7. In other words the pH reading was low indicating a greater acidity of the solution, presumably caused by the surfactant. Since the surfactant effects the pH, Triton QS-10 is not suitable for purposes of the instant invention.

In the next test 175 cc. of tap water showed a pH reading of 8.1 which was stable. When 2.5 milliliters of benzene were added the reading fluctuated between 7 and 9. The reading seemed to be between 7 and 9 with the instrument needle fluctuating across the full scale. One drop of Triton X-301, and anionic surfactant, was then added. This surfactant is a sodium alkyl aryl polyether sulfate containing from 9 to 10 ethylene oxide groups. The fluctuations of the pH meter decreased and the readings seemed to be between 7.5 and 8.5. With the addition of two drops of the surfactant the fluctuations of the pH reading decreased further and the readings seemed to be between 7.7 and 8.3. With the addition of three drops the fluctuations continued between 7.8 and 8.3 but the reading seemed to be 8.15. With the addition of eleven drops of surfactant the pH reading seemed to be 8.2 and stable within ±0.1. With the addition of 2.5 to 3.0 cc. of the surfactant the pH reading increased slightly to 8.35. Thus this anionic surfactant had some slight effect on the pH. However the effect is so slight this surfactant is acceptable for purposes of the instant invention.

In another series of tests the pH of 175 cc. of tap water was measured as 8.1. When 2.5 cc. of benzene were added the needle started fluctuating from a pH reading of 2 to a pH reading of 9 mostly fluctuating between 7.5 and 8.5. When one drop of the surfactant known as Triton QS-15, an anionic surfactant, was added the needle fluctuated between 8 and 10 with the readings seeming to be 9.3. When two drops of QS-15 were added the pH reading stabilized at 9.7. When four drops were added the reading increased to 9.9. When the solution was left overnight the pH decreased to 9.2. These tests indicated the presence of this particular anionic surfactant has an effect on the measured pH. Accordingly this surfactant is not suitable for purposes of the instant invention.

Based upon the above tests the three particularly effective surfactants, in order of preference, would seem to be the nonanionic surfactant known as Tergitol 15-S-9, the nonanionic surfactant known as Triton X-100, and the anionic surfactant Triton X-301. The preference for the nonanionic surfactants is understandable in that one would not expect the surfactants to have any effect upon the indicated pH of the solution. Anionic surfactants are satisfactory so long as the effect upon the pH is small. Cationic surfactants in general are not satisfactory as their effect upon the indicated pH seems to be substantial. However, if the effect upon the indicated pH of a cationic surfactant is small enough, then it too could be used.

The effect of the surfactant is believed to be that it reduces the surface tension of the test solution and hence the contact angle between the test solution and the liquid junction structure bringing it below 90°. The contact angle is a function of the surface tension. The effect of the various surfactants on the surface tension and pH is summarized in Table II.

TABLE II

| Surfactant | Surface tension (dynes per square cm.) | Effect on the indicated pH of water |
|---|---|---|
| Tergitol 15-S-9 (0.1%) | 28 | Negligible. |
| Triton X-100 (0.01%) | 31 | Do. |
| Triton X-100 (1.0%) | 30 | Do. |
| Triton X-301 (0.01%) | 31 | Do. |
| Triton X-301 (1%) | 28 | Do. |
| Triton QS-10 (0.1%) | 27 | Acidic. |
| Triton QS-15 (1%) | 40 | Alkaline. |
| Priminox T-1M (0.1%) | | Do. |

In additional tests the surfactants were added to the internal electrolyte of the electrode and the results were equally satisfactory. The addition of the surfactants was found in these investigations to have no noticeable effect upon the electrode potentials of the electrode.

The solubility of benzene in water is about 0.06%. The presence of even this low concentration of an organic material can be detrimental to the successful operation of the electrode. However, when the surfactant was added to the internal electrolyte of the electrode it was found that as much as 50 to 75% benzene could be present in the test solution without affecting the performance of the electrode.

It will be appreciated the foregoing is a description of exemplary embodiments of the instant invention. This is for illustrative purposes only and the instant invention is not to be limited thereby but only by the claims wherein what is claimed is:

1. In an electrochemical cell for use in ion potential measurements of test solutions forming the external electrolyte of the cell, and which contains a sensing electrode, and a reference electrode, wherein the reference electrode comprises an internal half cell supported in a container of nonconductive material containing a salt solution as an internal electrolyte and a liquid junction structure of an ion permeable material comprising a hydrophobic polymer, the improvement which comprises a surfactant selected from the group consisting of nonionic and anionic surfactants in contact with the liquid junction structure so that the contact angle between the test solution and the liquid junction structure is less than about 90°, whereby the liquid junction structure is made more permeable to water molecules.

2. The electrochemical cell of claim 1 wherein the hydrophobic polymer is selected from the group consisting of polyfluoroalkane, polyethylene, and polyvinylchloride.

3. The electrochemical cell of claim 1 wherein the hydrophobic polymer is a polytetrafluoroalkane.

4. The electrochemical cell of claim 1 wherein the hydrophobic polymer is polytetrafluoroethylene.

5. The electrochemical cell of claim 1 wherein the quantity of surfactant present is from about 10 parts per million to about 10,000 parts per million.

6. The electrochemical cell of claim 1 wherein the surfactant is present in the internal electrolyte.

7. The electrochemical cell of claim 1 wherein the surfactant is a nonionic surfactant.

8. The electrochemical cell of claim 7 wherein the surfactant is selected from the group consisting of ethoxylates of isomeric linear alcohols, and alkyl phenyl ethers of polyethylene glycol.

9. The electrochemical cell of claim 8 wherein the surfactant is an alkyl phenyl ether of polyethylene glycol wherein the alkyl phenyl group is from octylphenol, and containing 9 to 10 ethylene oxide groups.

10. The electrochemical cell of claim 8 wherein the surfactant is an ethoxylate of an isomeric linear alcohol, the linear alkyl portion comprising a mixture of $C_{11}$ to $C_{15}$ linear chains and the ethoxy portion contains 9 ethylene oxide groups.

11. The electrochemical cell of claim 1 wherein the surfactant is a sodium alkyl aryl polyether sulfate containing from 9 to 10 ethylene oxide groups.

12. In an electrochemical reference electrode for use in ion potential measurements of solutions, which comprises an internal half cell supported in a container of nonconductive material containing a salt solution as an internal electrolyte, and a liquid junction structure of an ion permeable material comprising a hydrophobic polymer, the improvement which comprises a surfactant selected from the group consisting of nonionic and anionic surfactants in contact with the liquid junction structure so that the contact angle between the solution being measured and the liquid junction structure is less than about 90°, whereby the liquid junction structure is made more permeable to water molecules.

13. The electrode of claim 12 wherein the hydrophobic polymer is selected from the group consisting of polyfluoroalkane, polyethylene, and polyvinyl chloride.

14. The electrode of claim 12 wherein the hydrophobic polymer is a polytetrafluoroalkane.

15. The electrode of claim 12 wherein the hydrophobic polymer is polytetrafluoroethylene.

16. The electrode of claim 12 wherein the quantity of surfactant present is from about 10 parts per million to about 10,000 parts per million.

17. The electrode of claim 12 wherein the surfactant is present in the internal electrolyte.

18. The electrode of claim 12 wherein the surfactant is a nonionic surfactant.

19. The electrode of claim 18 wherein the surfactant is selected from the group consisting of ethoxylates of isomeric linear alcohols, and alkyl phenyl ethers of polyethylene glycol.

20. The electrode of claim 19 wherein the surfactant is an alkyl phenyl ether of polyethylene glycol wherein the alkyl phenyl group is from octylphenol, and containing 9 to 10 ethylene oxide groups.

21. The electrode of claim 19 wherein the surfactant is an ethoxylate of an isomeric linear alcohol, the linear alkyl portion comprising a mixture of $C_{11}$ to $C_{15}$ linear chains and the ethoxy portion contains 9 ethylene oxide groups.

22. The electrode of claim 12 wherein the surfactant is a sodium alkyl aryl polyether sulfate containing from 9 to 10 ethylene oxide groups.

23. In an electrochemical cell for use in ion potential measurements of test solutions forming the external electrolyte of the cell and which contains a sensing electrode and a reference electrode, wherein the sensing electrode comprises an internal half cell supported in a container of nonconductive material containing a salt solution as an internal electrolyte and a membrane of an ion permeable material comprising a hydrophobic polymer, the improvement which comprises a surfactant selected from the group consisting of nonionic and anionic surfactants in contact with the membrane so that the contact angle between the test solution and the membrane is less than about 90°, whereby the membrane is made more permeable to water molecules.

24. The electrochemical cell of claim 23 wherein the hydrophobic polymer is selected from the group consisting of polyfluoroalkane, polyethylene, and polyvinylchloride.

25. The electrochemical cell of claim 23 wherein the hydrophobic polymer is a polytetrafluoroalkane.

26. The electrochemical cell of claim 23 wherein the hydrophobic polymer is polytetrafluoroethylene.

27. The electrochemical cell of claim 23 wherein the quantity of surfactant present is from about 10 parts per million to about 10,000 parts per million.

28. The electrochemical cell of claim 23 wherein the surfactant is present in the internal electrolyte.

29. The electrochemical cell of claim 23 wherein the surfactant is a nonionic surfactant.

30. The electrochemical cell of claim 29 wherein the surfactant is selected from the group consisting of ethoxylates of isomeric linear alcohols, and alkyl phenyl ethers of polyethylene glycol.

31. The electrochemical cell of claim 30 wherein the surfactant is an alkyl phenyl ether of polyethylene glycol wherein the alkyl phenyl group is from octylphenol, and containing 9 to 10 ethylene oxide groups.

32. The electrochemical cell of claim 30 wherein the surfactant is an ethoxylate of an isomeric linear alcohol, the linear alkyl portion comprising a mixture of $C_{11}$ to $C_{15}$ linear chains and the ethoxy portion contains 9 ethylene oxide groups.

33. The electrochemical cell of claim 23 wherein the surfactant is a sodium alkyl aryl polyether sulfate containing from 9 to 10 ethylene oxide groups.

34. In an electrochemical sensing electrode for use in ion potential measurements of solutions, which comprises an internal half cell supported in a container of nonconductive material containing a salt solution as an internal electrolyte, and a membrane of an ion permeable material comprising a hydrophobic polymer, the improvement which comprises a surfactant selected from the group consisting of nonionic and anionic surfactants in contact with the membrane so that the contact angle between the solution being measured and the membrane is less than about 90°, whereby the membrane is made more permeable to water molecules.

35. The electrode of claim 34 wherein the hydrophobic polymer is selected from the group consisting of polyfluoroalkane, polyethylene, and polyvinyl chloride.

36. The electrode of claim 34 wherein the hydrophobic polymer is a polytetrafluoroalkane.

37. The electrode of claim 34 wherein the hydrophobic polymer is polytetrafluoroethylene.

38. The electrode of claim 34 wherein the quantity of surfactant present is from about 10 parts per million to about 10,000 parts per million.

39. The electrode of claim 34 wherein the surfactant is present in the internal electrolyte.

40. The electrode of claim 34 wherein the surfactant is a nonionic surfactant.

41. The electrode of claim 40 wherein the surfactant is selected from the group consisting of ethoxylates of isomeric linear alcohols, and alkyl phenyl ethers of polyethylene glycol.

42. The electrode of claim 41 wherein the surfactant is an alkyl phenyl ether of polyethylene glycol wherein the alkyl phenyl group is from octylphenol, and containing 9 to 10 ethylene oxide groups.

43. The electrode of claim 41 wherein the surfactant is an ethoxylate of an isomeric linear alcohol, the linear alkyl portion comprising a mixture of $C_{11}$ to $C_{15}$ linear chains and the ethoxy portion contains 9 ethylene oxide groups.

44. The electrode of claim 34 wherein the surfactant is a sodium alkyl aryl polyether sulfate containing from 9 to 10 ethylene oxide groups.

References Cited

UNITED STATES PATENTS

| | | | |
|---|---|---|---|
| 3,380,905 | 4/1968 | Clark | 204—195 |
| 3,434,953 | 3/1969 | Porter et al. | 204—195 |
| 3,492,216 | 1/1970 | Riseman et al. | 204—195 |
| 3,562,130 | 2/1971 | Hoole et al. | 204—195 |

TA-HSUNG TUNG, Primary Examiner

U.S. Cl. X.R.

204—IT, 195 M